US007623793B2

(12) United States Patent
Morris et al.

(10) Patent No.: US 7,623,793 B2
(45) Date of Patent: Nov. 24, 2009

(54) SYSTEM AND METHOD OF CONFIGURING FIBER OPTIC COMMUNICATION CHANNELS BETWEEN ARRAYS OF EMITTERS AND DETECTORS

(75) Inventors: Terrel L. Morris, Garland, TX (US); David Martin Fenwick, Chelmsford, MA (US); Richard John Luebs, Windsor, CO (US); Duane A. Wegher, Ft. Collins, CO (US); Jeffry D. Yetter, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 744 days.

(21) Appl. No.: 10/915,612

(22) Filed: Aug. 10, 2004

(65) Prior Publication Data

US 2006/0034613 A1 Feb. 16, 2006

(51) Int. Cl.
*H04B 10/12* (2006.01)
(52) U.S. Cl. .............................. 398/156; 398/15; 398/25
(58) Field of Classification Search .................. 398/15, 398/25, 156
See application file for complete search history.

(56) References Cited

U.S. PATENT DOCUMENTS

| 4,545,074 | A | 10/1985 | Balliet et al. |
|---|---|---|---|
| 4,568,931 | A | 2/1986 | Biolley et al. |
| 5,023,863 | A | 6/1991 | Masuda |
| 5,123,073 | A | 6/1992 | Pimpinella |
| 5,218,654 | A | 6/1993 | Sauter |
| 5,245,680 | A | 9/1993 | Sauter |
| 5,420,954 | A | 5/1995 | Swirhun et al. |
| 5,430,442 | A | 7/1995 | Kaiser et al. |

(Continued)

FOREIGN PATENT DOCUMENTS

EP 311 772 4/1989

(Continued)

OTHER PUBLICATIONS

Ahsan, Muhammad. "Access Methods (Contention & Token Passing)". suite101.com. Oct. 28, 2000. <http://www.suite101.com/print_article.cfm/laning_retired/44958> viewed on Mar. 24, 2009.*

(Continued)

*Primary Examiner*—Leslie Pascal

(57) ABSTRACT

A system for configuring fiber optic communication channels between arrays of emitters and detectors comprises: an array of light emitters; an array of light detectors; a bundle of optical fibers disposed between the arrays of light emitters and light detectors for conducting light from the light emitters to the light detectors, wherein the number of optical fibers in the bundle is greater than the number of light emitters in the array and wherein an area cross-section of the bundle of optical fibers overlaps the array of light emitters and the array of light detectors; and logic for mapping at least one emitter to at least one detector to establish at least one optical fiber communication channel between the array of light emitters and the array of light detectors. The system is further operative to monitor data communication over the at least one fiber optic communication channel and to reconfigure the mapping based on the monitored data communications thereof. A counterpart method of configuring fiber optic communication channels between arrays of emitters and detectors is also disclosed.

21 Claims, 8 Drawing Sheets

U.S. PATENT DOCUMENTS

| | | | |
|---|---|---|---|
| 5,465,379 A | 11/1995 | Li et al. | |
| 5,477,363 A | 12/1995 | Matsuda | |
| 5,497,465 A | 3/1996 | Chin et al. | |
| 5,515,195 A | 5/1996 | McAdams | |
| 5,539,559 A * | 7/1996 | Cisneros et al. | 398/51 |
| 5,600,748 A | 2/1997 | Kosaka | |
| 5,631,988 A | 5/1997 | Swirhun et al. | |
| 5,764,834 A | 6/1998 | Hultermans | |
| 5,920,664 A | 7/1999 | Hirabayashi et al. | |
| 6,185,648 B1 | 2/2001 | Munoz-Bustamante | |
| 6,334,784 B1 | 1/2002 | Howard | |
| 6,363,182 B2 | 3/2002 | Mills et al. | |
| 6,379,053 B1 | 4/2002 | van Doorn | |
| 6,398,425 B2 | 6/2002 | Williams et al. | |
| 6,430,335 B1 | 8/2002 | Carberry et al. | |
| 6,487,351 B1 * | 11/2002 | Cryan et al. | 385/120 |
| 6,509,992 B1 | 1/2003 | Goodwill | |
| 6,527,456 B1 | 3/2003 | Trezza | |
| 6,580,865 B1 | 6/2003 | Doorn | |
| 6,583,445 B1 | 6/2003 | Reedy et al. | |
| 6,583,904 B1 * | 6/2003 | Mahlab et al. | 398/129 |
| 6,587,605 B2 | 7/2003 | Paniccia et al. | |
| 6,588,943 B1 | 7/2003 | Howard | |
| 6,603,899 B1 | 8/2003 | Popp et al. | |
| 6,628,860 B1 | 9/2003 | Van Doorn | |
| 6,634,812 B2 | 10/2003 | Ozeki et al. | |
| 6,651,139 B1 | 11/2003 | Ozeki et al. | |
| 6,661,940 B2 | 12/2003 | Kim | |
| 6,674,971 B1 | 1/2004 | Boggess et al. | |
| 6,695,493 B2 | 2/2004 | Ciemiewcz | |
| 6,763,157 B1 | 7/2004 | Williams et al. | |
| 2001/0030782 A1 * | 10/2001 | Trezza | 359/110 |
| 2002/0149825 A1 | 10/2002 | Levy et al. | |
| 2002/0178319 A1 | 11/2002 | Sanchez-Olea | |
| 2003/0081281 A1 | 5/2003 | DeCusatis et al. | |

FOREIGN PATENT DOCUMENTS

| | | |
|---|---|---|
| EP | 351 729 | 1/1990 |
| EP | 367 460 | 5/1990 |
| EP | 811 862 | 12/1997 |
| EP | 868 049 | 9/1998 |
| EP | 1 180 912 | 2/2002 |

OTHER PUBLICATIONS

Weik, Martin H. "contention". Fiber Optics Standard Dictionary. 3rd ed. 1997.*

U.S. Appl. No. 10/915,613 Response to Restriction filed Jul. 31, 2006.

U.S. Appl. No. 10/915,613 Office Action mailed Sep. 6, 2006.

U.S. Appl. No. 10/915,613 Amendment filed Nov. 17, 2006.

U.S. Appl. No. 10/915,613 Office Action mailed Dec. 11, 2006.

U.S. Appl. No. 10/915,613 Amendment filed Feb. 5, 2007.

U.S. Appl. No. 10/915,613 Advisory Action mailed Apr. 18, 2007.

U.S. Appl. No. 10/915,613 Applicant's Interview Summary filed May 11, 2007.

U.S. Appl. No. 10/915,613 Examiner's Interview Summary filed May 14, 2007.

U.S. Appl. No. 10/915,613 Notice of Allowance.

B. Robertson, et al., "Design and Operation of an in situ Microchannel Alighment-Detection System", Applied Optics, vol. 37, No. 23, Aug. 10, 1998, p. 5368-5376.

B. Robertson, "Design of an Optical Interconnect for Photonic Backplane Applications", Applied Optics, vol. 37, No. 14, May 10, 1998, p. 2974-2984.

M. Jonsson, et al. "Optical Interconnection Technology in Switches, Routers and Optical Cross Connects", Ericsson Report, p. 1-43, Oct. 2000.

R. Sims, "Scaling Laws for MEMS Mirror-Rotation Optical Cross Connect Switches", Journal of Lightwave Technology, vol. 20, No. 7, Jul. 2002, p. 1084-1094.

F. Tooley, "Challenges in Optically Interconnecting Electronics", IEEE Journal of Selected Topics in Quantum Electronics, vol. 2, No. 1, Apr. 1996, p. 3-13.

* cited by examiner

SYSTEM AND METHOD OF CONFIGURING FIBER OPTIC COMMUNICATION CHANNELS BETWEEN ARRAYS OF EMITTERS AND DETECTORS

CROSS REFERENCES TO RELATED APPLICATIONS

This patent application is related to U.S. patent application Ser. Nos. 10/980,595, 10/980,591, and 10/980,746 which is now U.S. Pat. No. 7,118,285, all filed on Nov. 3, 2004, and titled "Optical Connections and Methods of Forming Optical Connections." Other U.S. patent applications that may have related subject matter include the following: U.S. patent application Ser. No. 10/945,007 entitled "Apparatus and Method of Providing an Optical Connection between PC Boards for Optical Communication," now U.S. Pat. No. 7,229,218 having at least one common inventor with this application; U.S. patent application Ser. No. 10/915,641, now U.S. Pat. No. 7,251,388 entitled "Apparatus For Providing Optical Communication Between Integrated Circuits Of Different PC Boards And An Integrated Circuit Assembly For Use Therein," having at least one common inventor with this application; U.S. patent application Ser. No. 10/980,521 entitled "Optical Bus System," having at least one common inventor with this application; U.S. patent application Ser. No. 10/936,874 entitled "Apparatus And Method Of Establishing Optical Communication Channels Between A Steerable Array Of Laser Emitters And An Array Of Optical Detectors," having at least one common inventor with this application; U.S. patent application Ser. No. 10/898,834 entitled "Apparatus And Method Of Providing Separate Control And Data Channels Between Arrays Of Light Emitters And Detectors For Optical Communication And Alignment," having at least one common inventor with this application; U.S. patent application Ser. No. 10/979,989 entitled "Optical Connections And Methods Of Forming Optical Connections," having at least one common inventor with this application; and U.S. patent application Ser. No. 10/915,613 entitled "System And Method Of Configuring Fiber Optic Communication Channels Between Arrays Of Emitters And Detectors," having at least one common inventor with this application and now U.S. Pat. No. 7,269,321.

BACKGROUND OF THE INVENTION

The present invention relates to optical communication systems, in general, and more particularly to a system and method of configuring fiber optic communication channels between arrays of emitters and detectors.

Greater demands for increased bandwidth are being made on data communication between electrical data processing units or subunits, like printed circuit (PC) boards, for example. Communication rates of tens of gigabits per second are exemplary of such demands. These demands can not be met by traditional metal electrical connections, like those found on mother boards and back plane connections, for example. One solution to meet these demands is to create optical communication channels for board-to-board communication using a light coupling bundle of optical fibers disposed between an array of light emitters on one PC board and an array of light detectors on another PC board. In this solution, there is a one-to-one relationship between the optical fibers in the bundle and the light emitters/detectors of the PC board arrays.

A drawback to this solution is that each optical fiber of the light coupling bundle must be precisely aligned with a corresponding light emitter/detector pair of the PC board arrays. This precise alignment is no simple task and generally requires additional equipment and man-hours to achieve. In addition, once the precise alignment is initially achieved, it may have to be repeated from time to time, due to misalignment due to such effects as shock, vibration, temperature changes and the like, for example. To alleviate these drawbacks to fiber optic communication, some designers have proposed creating optical communication channels by free-space inter-couplings. However, free-space optical communication channels have their own set of drawbacks and are generally used only when communication bandwidths greater than those afforded by optical fiber links are applicable.

The present invention overcomes the drawbacks of the light coupling bundle of optical fibers to provide a configuration of optical communication channels between arrays of light emitters and detectors without initial precise alignment and including a method for dynamic reconfiguration.

SUMMARY

In accordance with one aspect of the present invention, a system for configuring fiber optic communication channels between arrays of emitters and detectors comprises: an array of light emitters; an array of light detectors; a bundle of optical fibers disposed between the arrays of light emitters and light detectors for conducting light from the light emitters to the light detectors, wherein the number of optical fibers in the bundle is greater than the number of light emitters in the array and wherein an area cross-section of the bundle of optical fibers overlaps the array of light emitters and the array of light detectors; and logic for mapping at least one emitter to at least one detector to establish at least one fiber optic communication channel between the array of light emitters and the array of light detectors.

DETAILED DESCRIPTION OF THE INVENTION

Figure 1:
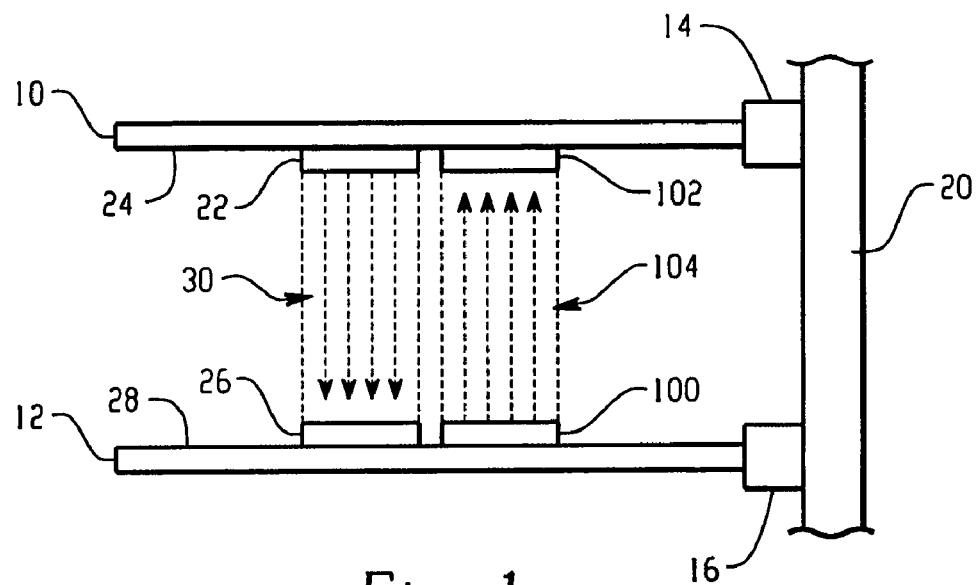
FIG. 1 is an illustration of an exemplary data processing system embodiment suitable for application of the present invention.

FIG. 1 is an illustration of an exemplary data processing system embodiment suitable for application of the present invention. Referring to FIG. 1, at least two PC boards 10 and 12, which are considered data processing subunits of the processing system, are connected through suitable electrical connectors 14 and 16, respectively, to a mother board or back plane electrical assembly 20. In the present embodiment, the PC boards 10 and 12 are stacked in parallel arrangement with board 10 on top of board 12. However, it is understood that an arrangement of boards in parallel side by side will function just as well. An array of electro-optic elements 22, like light emitters, for example, are disposed on a side 24 of board 10 and an array of opto-electric elements 26, like light detectors, for example, are disposed on a side 28 of board 12 that faces side 24 of board 10. The light emitters of array 22 may emit either coherent light (i.e. from a laser diode) or non-coherent light (i.e. from an light emitting diode or other similar source).

It is understood that the arrays 22 and 26 may be designed with many different shapes and configurations without deviating from the broad principles of the present invention. In the present embodiment, the arrays are rectangular in shape and configured in rows and columns, like that shown by way of example for the light emitting array 22 in FIG. 3 in which the darkened circles designate the light emitters, and for the light detecting array 26 in FIG. 4 in which the open circles designate the light detectors.

Figure 5A:
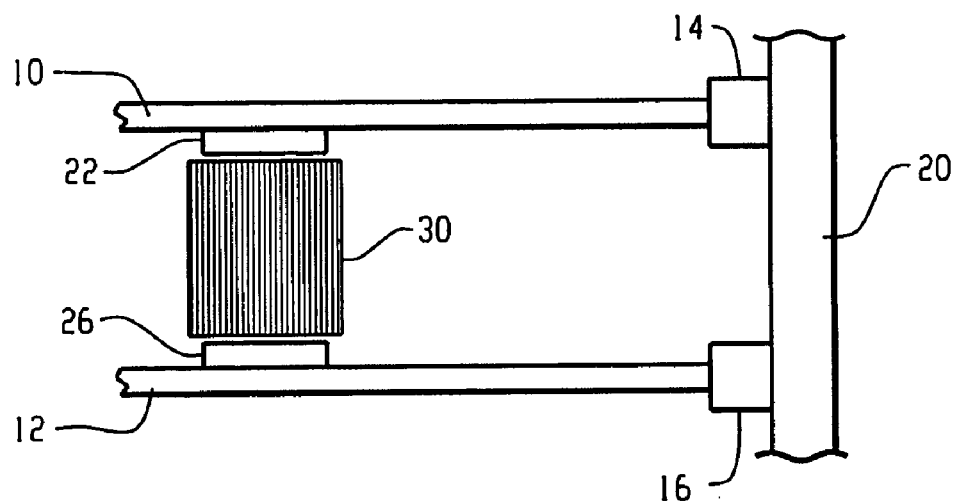
FIG. 5A is an illustration of an exemplary data processing system embodiment suitable for application of one aspect of the present invention.
Figure 5B:
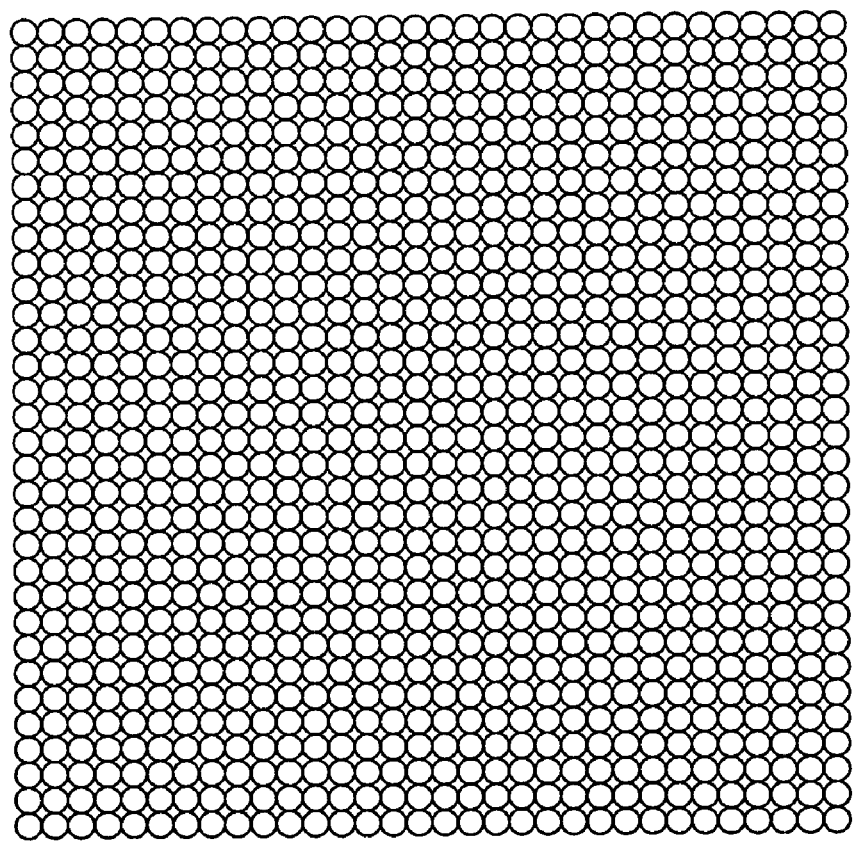
FIG. 5B is an illustration of an exemplary optical fiber bundle suitable for use in the embodiment of FIG. 5A.
Figure 5C:
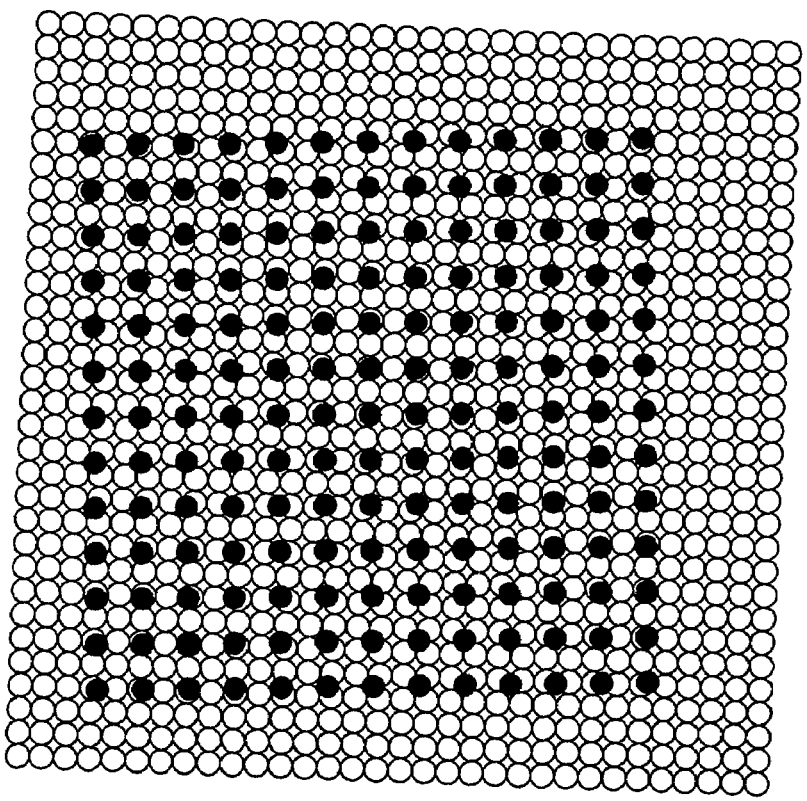
FIG. 5C is an illustration of an exemplary alignment of the optical fiber bundle of FIG. 5B to an array of light emitters.
Figure 5D:
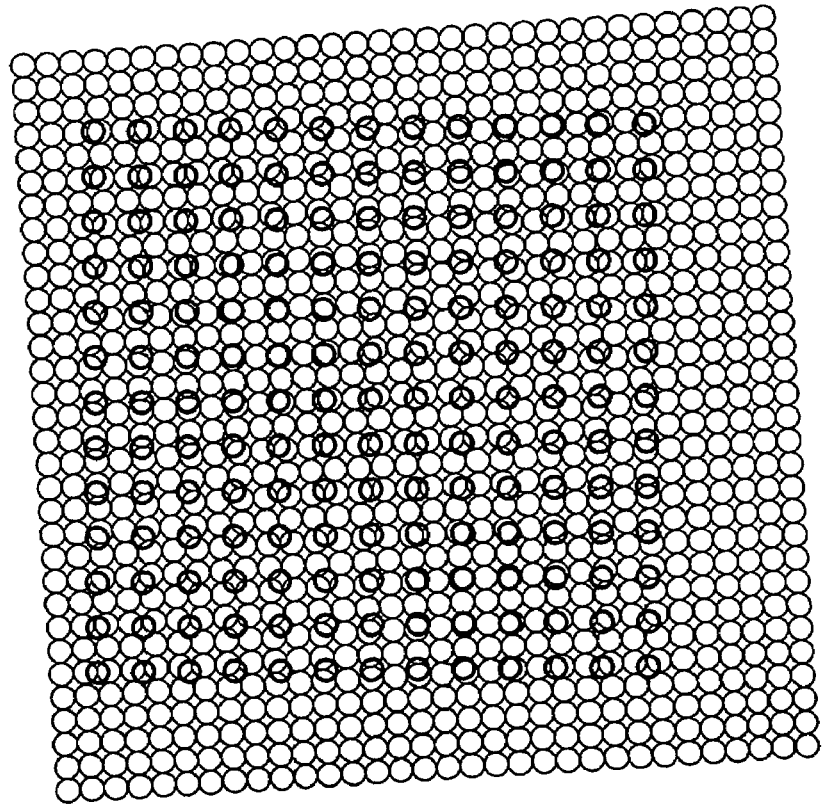
FIG. 5D is an illustration of an exemplary alignment of the optical fiber bundle of FIG. 5B to an array of light detectors.

Referring back to FIG. 1, disposed between the arrays 22 and 26 is a bundle of optical fibers 30 which conducts light emitted from the emitters of array 22 to the detectors of array 26. The optical fibers may be either plastic or multi-mode glass fibers, for example. The optical fiber bundle 30 may be roughly aligned with and coupled to the array 22 at one end and the array 26 at the other end by suitable optical connectors. One novel aspect of the present embodiment is that the number of optical fibers of the bundle 30 exceeds the number of emitters of the array 22 as shown in greater detail in the illustrations of FIGS. 5A-5B. It is understood that the illustrations of FIGS. 5A-5D are not drawn to scale. Typically, the optical fibers used to form the bundle 30 have an outer cladding diameter ranging from 62.5 µm to 125 µm, for example, and the emitters and detectors may be placed on centers as tight as 25-40 µm. Accordingly, a 32×32 array of optical fibers as shown in FIGS. 5B-5D would be approximately 0.315 square inches. Thus, the optical bundle 30 shown in FIG. 5A may be actually less than one-half its illustrated thickness.

In the present embodiment, the bundle 30 is rectangular in cross-sectional shape and the optical fibers thereof are configured in rows and columns as shown by way of example in FIG. 5B in which the open circles represent the cross-sections of the fibers. Note that the number of rows and columns of the optical fiber bundle 30 exceed the number of rows and columns of the arrays 22 and 26. In addition, the optical fibers of the bundle 30 may be of a smaller cross-section than the beams of emitted light of the light emitters of array 22 whereby a light beam of an emitter of the array 22 may be conducted through more than one optical fiber of the bundle 30 and be received by more than one of the detectors of the array 26.

Accordingly, in the present embodiment, each optical fiber of the bundle 30 does not have to be precisely aligned with the a corresponding light emitter/detector pair of the arrays 22 and 26, but rather the bundle of optical fibers 30 may be aligned roughly between the arrays 22 and 26 as shown by way of example in the FIGS. 5C and 5D so that the light from the array of emitters 22 as shown by the darkened circles (FIG. 5C) is conducted by the fiber optic bundle 30 and received by the array of detectors 26 as shown by the open circles in bold (FIG. 5D). Then, fiber optic communication channels may be configured by the present embodiment by mapping emitters of array 22 to detectors of array 26 which is exemplified in the block diagram schematic of FIG. 2.

Note that while the present embodiment uses a rectangular cross-section of rows and columns for the fiber optic bundle as shown in FIG. 5B, it is understood that the bundle 30 may take upon any cross-sectional shape so long as the cross-sectional area of the bundle 30 exceeds by a fair margin the outer boundaries of the arrays 22 and 26 as shown by the exemplary illustrations of FIGS. 5C and 5D. In this manner, the fiber optic bundle 30 may be conveniently disposed between and cover the arrays 22 and 26 without precise alignment.

Figure 2:
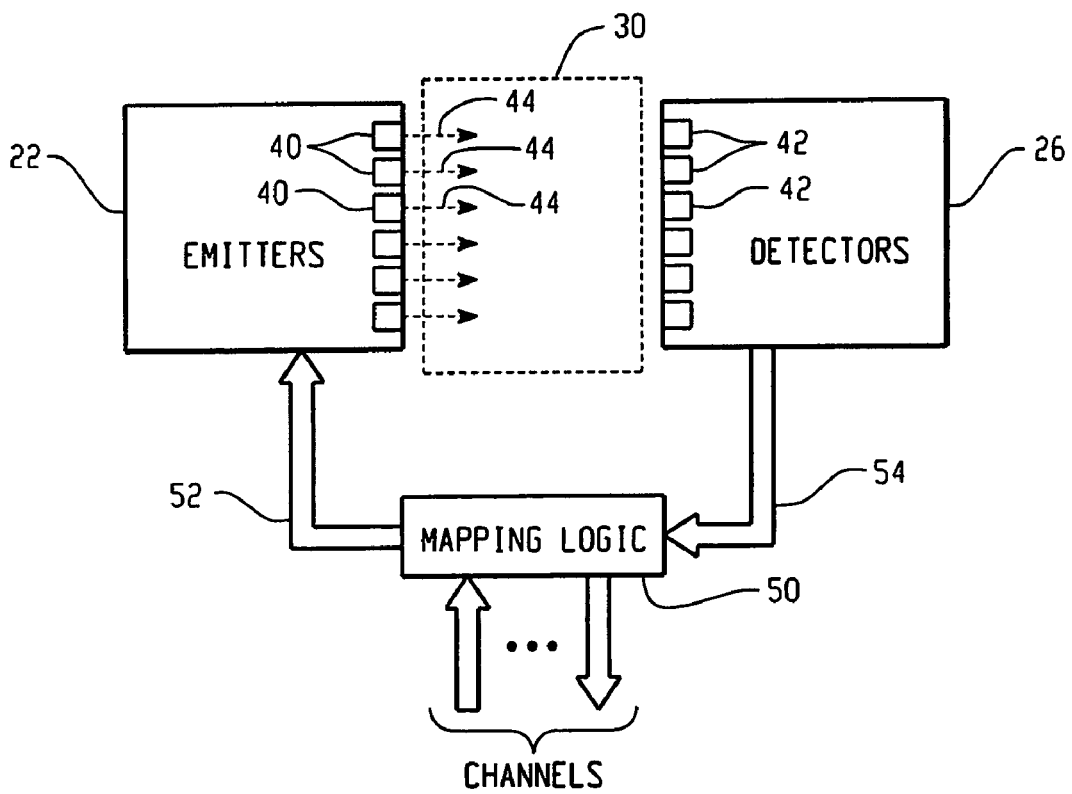
FIG. 2 is a block diagram schematic of a configuration system suitable for embodying the principles of the present invention.

Referring to FIG. 2, the arrays of light emitters and light detectors are denoted by the blocks 22 and 26 and the bundle of optical fibers is denoted by the dashed line block 30 disposed between the blocks 22 and 26. The sub-blocks 40 within the array block 22 represent individual light emitters of the array 22 and the sub-blocks 42 within the array block 26 represent individual light detectors of the array 26. Accordingly, when the light emitters 40 of array 22 are individually energized, they emit light beams denoted by the arrowed lines 44 which are conducted through the optical fiber bundle 30 and received by the light detectors 42 of array 26. In the present embodiment, a logic controller 50 which may comprise a programmed processor, for example, is provided for optical channel configuration as will become more evident from the following description. The controller 50 functions as mapping logic to establish light emitter/detector pairs for optical communication channels for wide bandwidth board-to-board communication.

The controller 50 may be coupled by signal lines 52 to each of the individual emitters 40 of the array 22 for the electrical energization thereof and similarly, may be coupled by signal lines 54 to each of the individual detectors 42 of the array 24. Thus, the controller 50 may control the energization of each of the emitters 40 individually to emit light through the optical fiber bundle 30, and may monitor which detectors 42 receive the emitted light and the magnitude of light received by each. Accordingly, the controller 50 may map an appropriate detector for each emitter to configure an optical communication channel using a suitable algorithm which may be programmed therein and executed thereby. It is understood that not all of the emitters 40 of the array 22 may be mapped to a detector 42 and thus, the number of communication channels configured by controller 50 may be less than the number of emitters 40 in the array 22. Once the mapping process is complete, the mapped emitter/detector pairs may be used as optical communication channels for unidirectional data transfers from board 10 to board 12.

Figure 3:
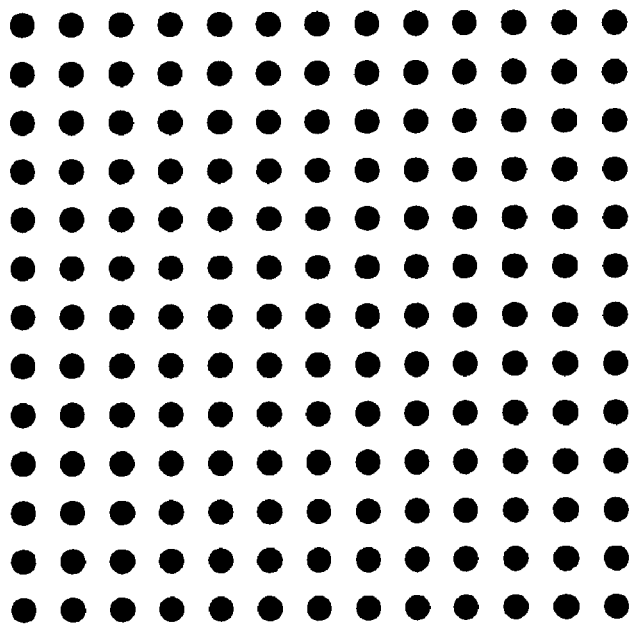
FIG. 3 is an illustration of an exemplary array of light emitters suitable for use in the embodiment of FIG. 2.
Figure 4:
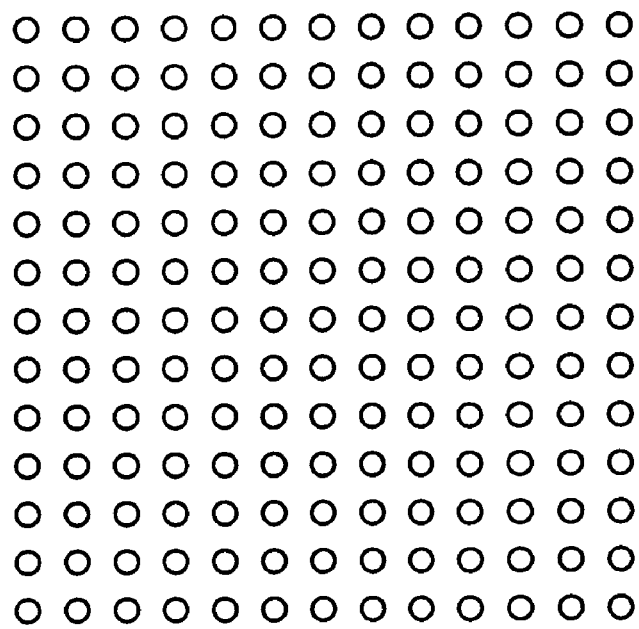
FIG. 4 is an illustration of an exemplary array of light detectors suitable for use in the embodiment of FIG. 2.
Figure 7:
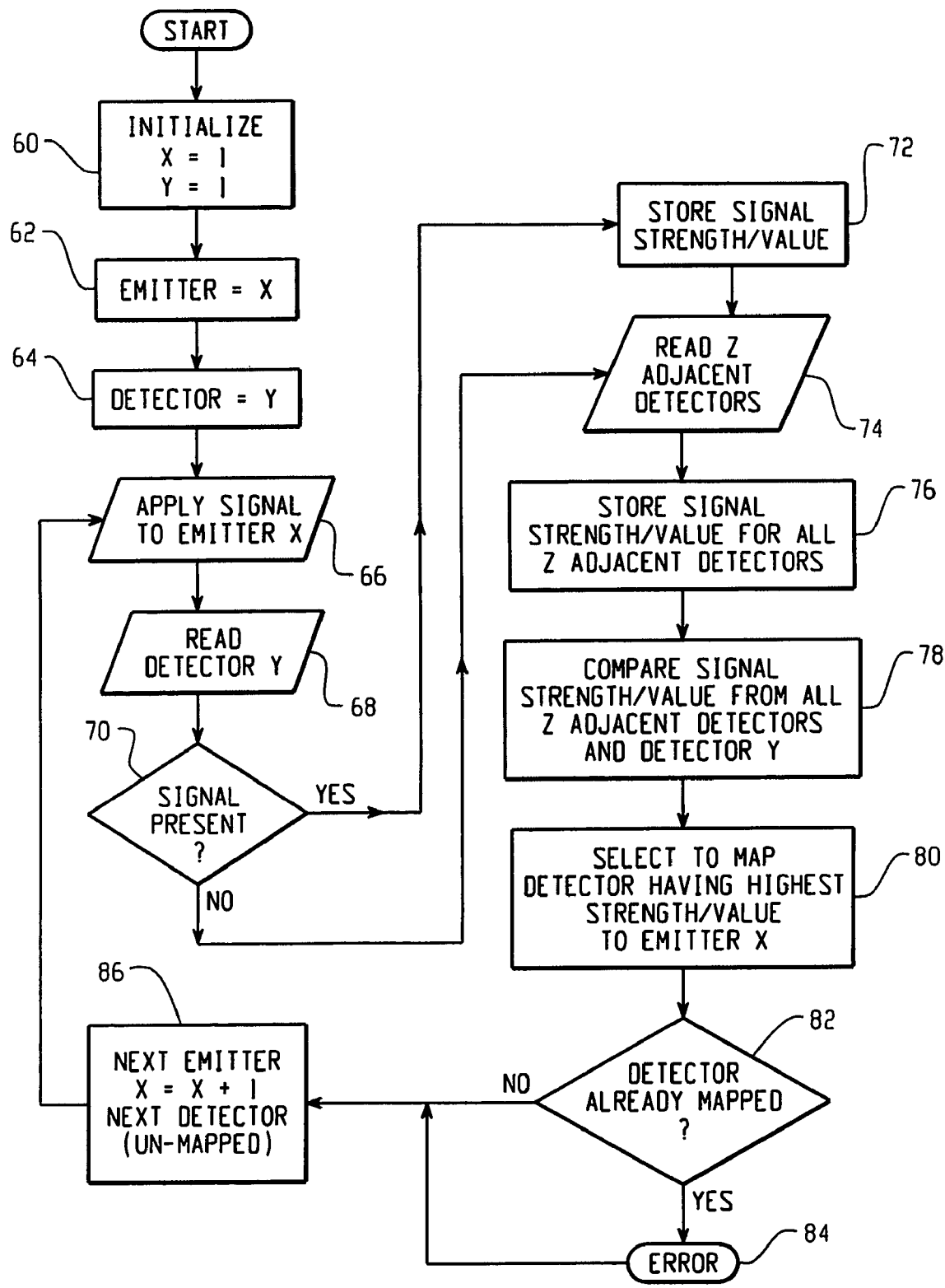
FIG. 7 is a flowchart of an exemplary process for configuring fiber optic communication channels suitable for use in the embodiment of FIG. 2.

A suitable algorithm for use by the programmed controller 50 in configuring the optical channels is shown in the flowchart of FIG. 7. Each block of the flowchart represents one or more steps of the algorithm. Referring to the flowchart of FIG. 7, the channel configuration process starts at step 60 wherein an initialization process is performed. As part of the initialization; the emitters 40 and detectors 42 may be numbered consecutively in some convenient manner. For example, if the emitters 40 are formed in rows and columns as shown by the example of FIG. 3, then the emitters 40 may be numbered consecutively from left to right starting with the top or first row and descending row to row to the bottom or last row. Since there are 13 rows and 13 columns in this example, the emitter in the upper most left hand corner of the array will be numbered 1 and the emitter in the lower most right hand corner will be numbered 169. The same numbering process may be performed by block 60 for the detectors 42 which are also in rows and columns as shown by FIG. 4. Also in block 60, the process may set the starting emitter number X and detector number Y to one.

In the next blocks 62 and 64, the emitter of array 22 and corresponding signal line of lines 52 associated with the number X and the detector of array 26 and corresponding signal line of lines 54 associated with the number Y are selected initially for processing. In block 66, a signal is applied by processor 50 over the corresponding signal line to emitter X (energization) to cause emitter X to generate a light beam through the optical fiber bundle 30 and the magnitude of light received by detector Y is read in over the corresponding signal line to the processor 50 in block 68. Next, in block 70, it is determined whether or not an appropriate light signal is present at detector Y. This may be accomplished in the present embodiment by comparing the light magnitude of detector Y to a minimum threshold. If the light value of detector Y exceeds the minimum threshold, then execution continues at block 72 wherein the magnitude value is stored in a designated register of a memory of processor 50. The memory of processor 50 may include a set of registers correspondingly designated to the detectors of array 26.

If the light value of detector Y does not exceed the minimum threshold, the processing bypasses the storage step of block 72 and continues at block 74 wherein the processor reads in the light magnitudes of the Z detectors adjacent the detector Y. This process may be conducted by first identifying the Z adjacent detectors by number, and then reading in each light value sequentially. The Z detectors may be those adjacent detector Y in row, column and diagonal (see FIG. 4), for example. For the present example, if detector Y is at an end of a top or bottom row, then Z=3; if detector Y is in a top or bottom row, but not at the end, or is at the end of a middle row, then Z=5; otherwise, Z=8. It is understood that for other array formations, the number of adjacent detectors could change.

In the next block 76, the read in light values of the Z adjacent detectors are stored in their designated registers of the memory of the processor 50. Then, in blocks 78 and 80, the stored light values are compared with each other to determine the light detector with highest light value which is selected for mapping to emitter X. Prior to mapping however, it is determined in decisional block 82 if the selected detector has been previously mapped. If so, then an error is indicated in block 84 and the emitter X may remain unmapped. That is, there will be no optical communications channel configured by the present embodiment for emitter X. Otherwise, emitter X is mapped to the selected detector to form a light emitter/detector pair of an optical communication channel and the selected detector is designated as being mapped. Thereafter, in block 86, the next emitter in consecutive order X=X+1 is selected for signal application and the next detector in consecutive order that is unmapped is set as the detector Y. Then, the steps of blocks 66 through 82 are repeated. This configuration process will continue for all of the emitters in the array 22 whereupon a complete mapping of optical communication channels for the arrays 22 and 26 via optical fiber bundle 30 is established.

Figure 8:
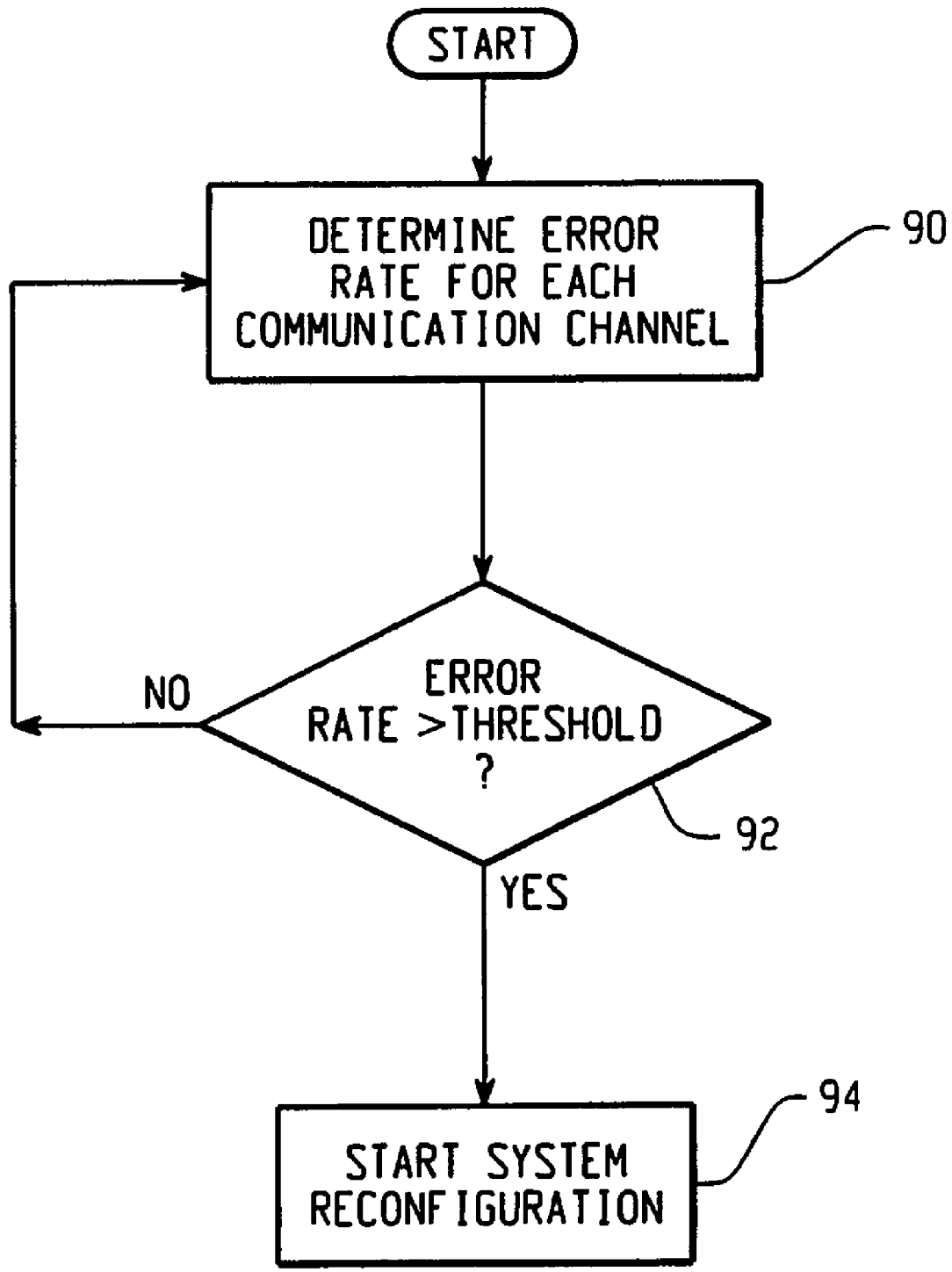
FIG. 8 is a flowchart of an exemplary process for reconfiguring fiber optic communication channels suitable for use with the embodiment of FIG. 2.

Once the configuration process is complete, board-to-board data communication over the established optical communication channels may commence. During normal system operation, it may be determined dynamically when to reconfigure the optical communication channels. In the present embodiment, this dynamic reconfiguration process is achieved through use of method steps shown by way of example in the flowchart of FIG. 8. Referring to FIG. 8, the method starts at block 90 wherein an error rate is established for each optical channel. This may be accomplished in the present embodiment through use of conventional error detection and correction (EDAC) techniques. For example, each time an error is detected in a channel, an error count in a designated memory register for that channel is incremented. Thus, an error rate may be determined by monitoring differences in count corresponding to predetermined intervals of time. When an error rate for a channel is determined to exceed a predetermined threshold by block 92, then the process initiates a channel reconfiguration in block 94 which may be accomplished by re-executing the flowchart of FIG. 7, for example. The reconfiguration process will continue to measure and monitor the error rates of the optical channels in block 90, if no channel exhibits an excessive error rate. Also, once a channel reconfiguration initiated by block 94 is complete, the process will continue at block 90.

While the present embodiment has been described in connection with unidirectional board-to-board data communication between arrays 22 and 26 via optical fiber bundle 30, it is understood that the same principles may apply to bidirectional board-to-board data communication by disposing another array of electro-optic elements or light emitters 100 on side 28 of board 12 and an array of opto-electric elements or light detectors 102 on side 24 of board 10. An optical fiber bundle 104 with an excessive number of fibers in relation to the number of elements of the arrays 100 and 102 may be disposed between the arrays 100 and 102. The optical communication channels for data communication from board 12 to board 10 may be configured and dynamically reconfigured through use of the arrays 100 and 102 in a similar process as that described herein above in connection with the embodiments of FIGS. 2, 7 and 8, for example. Thus, once configuration of the optical channels of arrays 100 and 102 are established, then bidirectional data communications between boards 10 and 12 may commence using the established optical communication channels for each direction.

Thus, in the embodiment of one aspect of the present invention, an excessive number of optical fibers in a bundle provide light conduction for configurable arrays of light emitters and light detectors to establish multiple optical communication channels for board-to-board communications without precise alignment of the arrays to the fiber links of the bundle. The emitters and detectors of the arrays may be configured in such a way that an appropriate fiber conduction path between a mapped emitter/detector pair is established as an optical communication channel. Due to the low cost of optical fibers and the high cost of precise alignment as noted above, this aspect of the present invention is considered favorable over the currently available fiber optic communication link techniques. In addition to the initial configuration of the optical communication channels, the error rate of each configured channel may be measured during normal operation of the system and when an observed error rate of a channel exceeds a predetermined threshold, the system may undergo a reconfiguration to establish new, possibly more reliable, optical communication channels. In this manner, the system maintains a low error rate among configured channels.

Figure 6A:
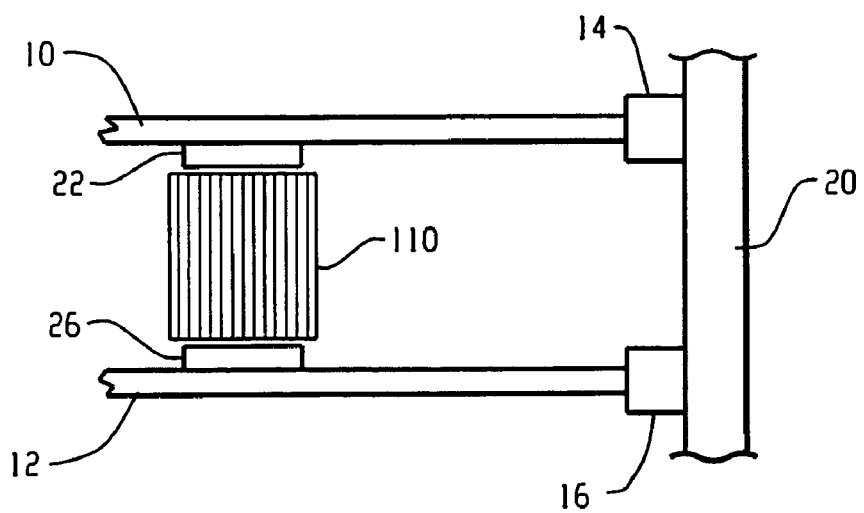
FIG. 6A is an illustration of an exemplary data processing system embodiment suitable for application of another aspect of the present invention.

In accordance with another novel aspect, an alternate embodiment shown by way of example in FIG. 6A includes a different optical fiber bundle 110 disposed between the arrays 22 and 26 for conducting light emitted from the emitters of array 22 to the detectors of array 26. In this novel aspect of the alternate embodiment, the diameter of the optical fibers of the bundle 110 substantially larger than the diameter of the light beams of the emitters of the array 22 as shown in greater detail in the illustrations of FIGS. 6B-6D. It is understood that the illustrations of FIGS. 6A-6D are not drawn to scale. In actual dimensions, the 11×11 array of optical fibers shown in FIGS. 6B-6D may be approximately 0.125 square inches or about the same thickness as the boards 10 and 12 shown in FIG. 6A. Thus, the optical bundle 110 shown in FIG. 6A may be less than one-half its illustrated thickness or roughly the same dimension as the thickness as the boards 10 and 12.

Figure 6B:
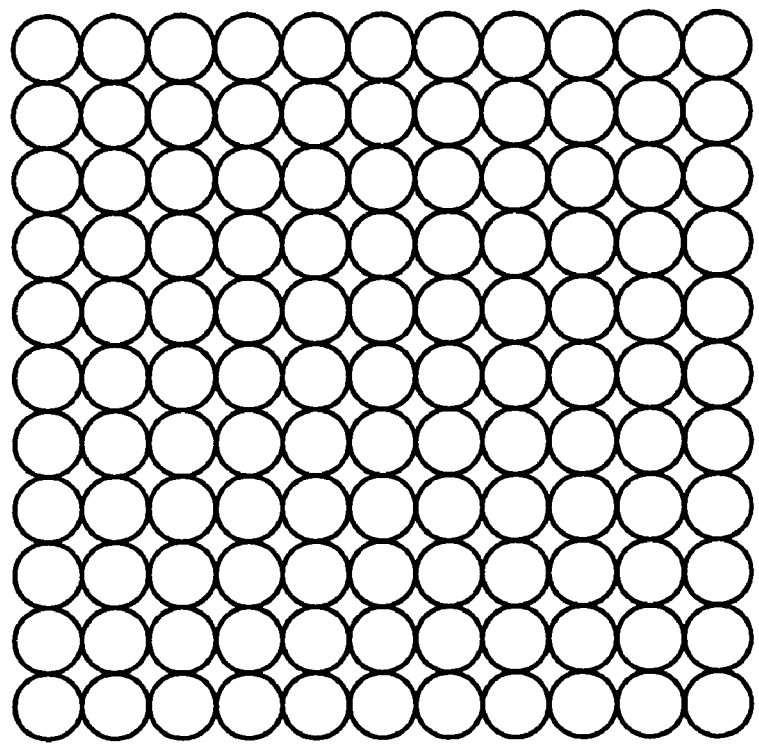
FIG. 6B is an illustration of an exemplary optical fiber bundle suitable for use in the embodiment of FIG. 6A.

In the alternate embodiment, the bundle 110 is rectangular in cross-sectional shape and the optical fibers thereof are configured in rows and columns as shown by way of example in FIG. 6B in which the open circles represent the cross-sections of the fibers. In addition to the optical fibers of the bundle 110 being of a larger diameter cross-section than the beams of emitted light of the light emitters of array 22, the number of rows and columns of the optical fiber bundle 110 may exceed the number of rows and columns of the arrays 22 and 26, whereby the light beams of more than one emitter of the array 22 may be conducted through one optical fiber of the bundle 110 and be received by more than one of the detectors of the array 26 as shown in FIGS. 6C and 6D.

Figure 6C:
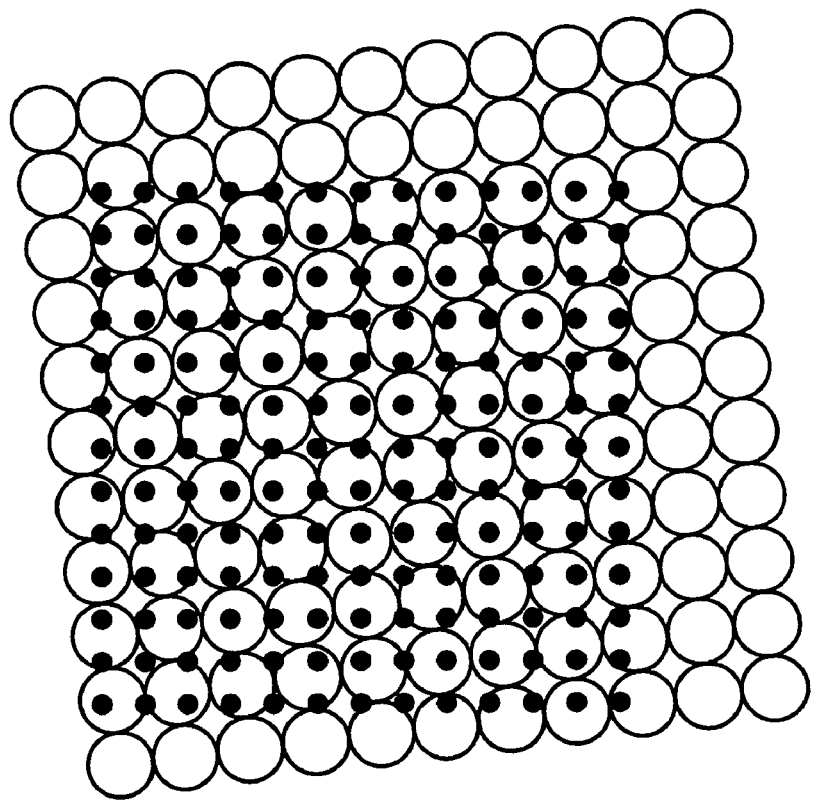
FIG. 6C is an illustration of an exemplary alignment of the optical fiber bundle of FIG. 6B to an array of light emitters.
Figure 6D:
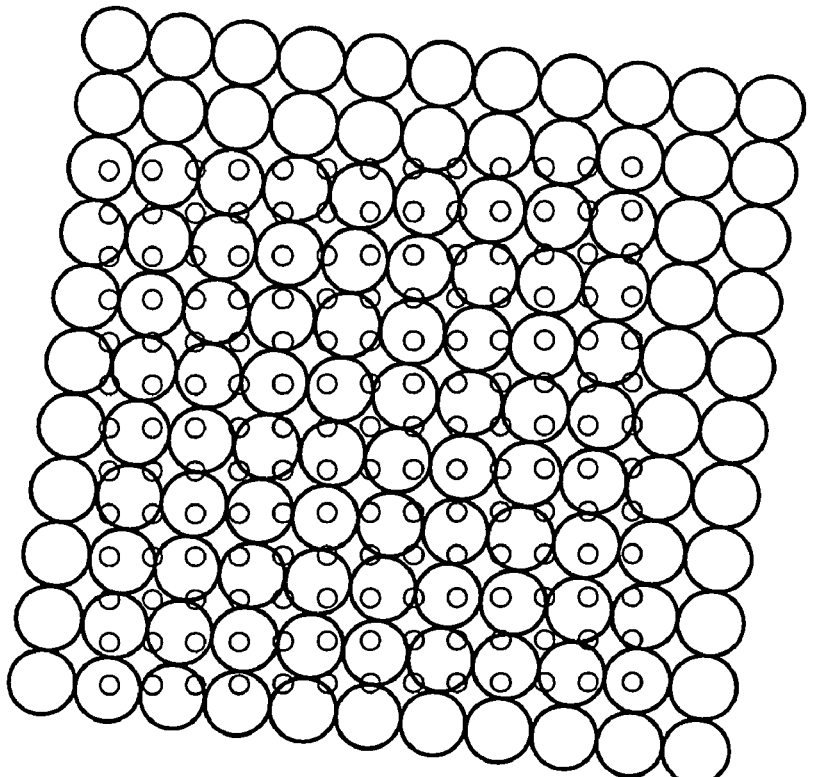
FIG. 6D is an illustration of an exemplary alignment of the optical fiber bundle of FIG. 6B to an array of light detectors.

Accordingly, in the alternate embodiment, each optical fiber of the bundle 110 does not have to be precisely aligned with the a corresponding light emitter/detector pair of the arrays 22 and 26, but rather the bundle of optical fibers 30 may be aligned roughly between the arrays 22 and 26 as shown by way of example in the FIGS. 6C and 6D so that the light from the array of emitters 22 as shown by the darkened circles (FIG. 6C) is conducted by the fiber optic bundle 30 and received by the array of detectors 26 as shown by the small open circles (FIG. 6D). The optical fiber bundle 110 may be coupled to the arrays 22 and 26 through use of suitable optical connectors at both ends. Then, fiber optic communication channels may be configured by the alternate embodiment by mapping emitters of array 22 to detectors of array 26 in the same or similar manner as described herein above in connection with the block diagram schematic of FIG. 2 and the flowcharts of FIGS. 7 and 8, for example.

Note that while the alternate embodiment uses a rectangular cross-section of rows and columns for the fiber optic bundle 110 as shown in FIG. 6B, it is understood that the bundle 110 may take upon any cross-sectional shape so long as the cross-sectional area of the bundle 110 exceeds by a fair margin the outer boundaries of the arrays 22 and 26 as shown by the exemplary illustrations of FIGS. 6C and 6D. In this manner, the fiber optic bundle 110 may be conveniently disposed between and cover the arrays 22 and 26 without precise alignment. The use of extra-large diameter fibers with respect to the emitted light beam diameters (see FIGS. 6B-6D) not only eliminates the process of precise alignment of the optical components, it also improves the tolerance the configured optical channels for vibration and thermal changes in the coupling connectors. Thus, the alternate embodiment also reduces cost of establishing functional optical interconnection between boards by obviating the need for precise alignment of the optical fibers. Bidirectional data communication of the alternate embodiment may be achieved between boards 10 and 12 much in the manner as described in connection with the embodiment of FIG. 1 herein above.

While the various novel aspects have been described herein above in connection with one or more embodiments, it is understood that this was done merely to present the invention by way of example. Accordingly, the present invention should not be limited to any single embodiment, but rather construed in breadth and broad scope in accordance with the claims appended hereto.

What is claimed is:

1. A system for configuring fiber optic communication channels between arrays of emitters and detectors, said system comprising:

an array of light emitters;

an array of light detectors;

a bundle of optical fibers disposed between said arrays of light emitters and light detectors for conducting light from said light emitters to said light detectors, wherein the number of optical fibers in said bundle is greater than the number of light emitters in said array and wherein an area cross-section of the bundle of optical fibers overlaps the array of light emitters and the array of light detectors; and logic for mapping at least one emitter to at least one detector to establish at least one fiber optic communication channel between the array of light emitters and the array of light detectors; wherein the logic for mapping comprising:

logic for identifying which detector of a plurality of mapped and unmapped detectors meets a light value satisfying criteria for the at least one emitter to be mapped;

logic for determining if the detector meeting the light value satisfying criteria has already been mapped to another emitter; and logic for disabling the at least one emitter to be mapped if the detector meeting the light value satisfying criteria has already been mapped to another emitter.

2. The system of claim 1 wherein the mapping logic comprises logic for energizing a light emitter of the light emitter array to transmit light to the array of light detectors through the optical fiber bundle and for mapping a light detector of the light detector array to the energized light emitter based on received light from the energized light emitter.

3. The system of claim 2 wherein the mapping logic comprises logic for identifying a grouping of light detectors of the light detector array that receive light from the energized light detector.

4. The system of claim 3 wherein the mapping logic is operative to read a magnitude of the received light of each of the light detectors of the grouping and to map one of the light detectors of the grouping to the energized light emitter based on the light magnitudes read from the light detectors of the grouping.

5. The system of claim 4 wherein the mapping logic is operative to map a light detector of the grouping having the greatest light magnitude to the energized light emitter to form an optical communication channel.

6. The system of claim 1 wherein the mapping logic comprises logic for sequentially energizing light emitters of the light emitter array to transmit light to the array of light detectors through the optical fiber bundle and for mapping an unmapped light detector of the light detector array to each energized light emitter based on received light from the energized light emitter to configure multiple fiber optic communication channels between the light emitter and light detector arrays.

7. The system of claim 1 wherein the mapping logic comprises logic for energizing a light emitter of the light emitter array to transmit light to the array of light detectors through more than one optical fiber of the bundle and for mapping a light detector of the light detector array to the energized light emitter based on received light from the energized light emitter.

8. The system of claim 7 wherein more than one light detector of the light detector array receives light from the energized light emitter through more than one optical fiber of the bundle; and wherein the mapped light detector is selected from said more than one light detectors receiving light from the energized light emitter based on the magnitudes of the light received by said more than one light detectors.

9. A system for dynamically reconfiguring fiber optic communication channels between arrays of emitters and detectors, said system comprising:
   an array of light emitters;
   an array of light detectors;
   a bundle of optical fibers disposed between said arrays of light emitters and light detectors for conducting light from said light emitters to said light detectors; logic for mapping at least one emitter to at least one detector to establish at least one fiber optic communication channel between the array of light emitters and the array of light detectors, the logic comprising:
     logic for identifying which detector of a plurality of mapped and unmapped detectors meets a light value satisfying criteria for the at least one emitter to be mapped;
     logic for determining if the detector meeting the light value satisfying criteria has already been mapped to another emitter; and
     logic for disabling the at least one emitter to be mapped if the detector meeting the light value satisfying criteria has already been mapped to another emitter; and
   means for monitoring data communication over said at least one communication channel and for reconfiguring said mapping based on said monitored data communications thereof.

10. The system of claim 9 wherein said monitoring means includes:
    means for measuring a data error rate of the at least one communication channel; and means for reconfiguring the mapping based on the measured data error rate thereof.

11. The system of claim 10 wherein the reconfiguring means based on the measured data error rate includes means for reconfiguring the mapping when the measured error rate thereof exceeds a predetermined threshold level.

12. The system of claim 9 wherein the number of optical fibers in the bundle is greater than the number of light emitters in said array and wherein an area cross-section of the bundle of optical fibers overlaps the array of light emitters and the array of light detectors.

13. A method of configuring fiber optic communication channels between arrays of emitters and detectors, said method comprising the steps of:
    energizing a light emitter of an array of light emitters to emit light through a bundle of optical fibers to an array of light detectors;
    identifying a grouping of mapped and unmapped light detectors of said array of light detectors that receive light emitted from said energized light emitter;
    identifying which light detector of said group of mapped and unmapped light detectors meets a light value satisfying criteria;
    determining whether said identified light detector meeting the light value satisfying criteria has already been mapped to another light emitter;
    disabling said light emitter if said light detector has already been mapped to another light emitter; and
    mapping said identified light detector to said energized light emitter if said light detector has not already been mapped to another light emitter to establish at least one fiber optic communication channel between the array of light emitters and the array of light detectors.

14. The method of claim 13 including the step of bundling a number of optical fibers in the bundle, said number of optical fibers being greater than the number of light emitters in said array and an area cross-section of the bundled optical fibers overlapping the array of light emitters and the array of light detectors.

15. The method of claim 13 wherein the step of mapping logic comprises mapping a light detector of the grouping of light detectors to the energized light emitter based on received light from the energized light emitter.

16. The method of claim 15 wherein the step of mapping includes the steps of: reading a magnitude of the received light of each of the light detectors of the grouping; and mapping one of the light detectors of the grouping to the energized light emitter based on the light magnitudes read from the light detectors of the grouping.

17. The method of claim 16 wherein the mapped light detector of the grouping is a light detector that has the greatest of the light magnitudes of the grouping.

18. The method of claim 13 including the steps of: sequentially energizing light emitters of the light emitter array to transmit light to the array of light detectors through the optical fiber bundle; identifying a grouping of light detectors of said array of light detectors corresponding to each energized light emitter; and mapping an unmapped light detector of the identified grouping to each energized light emitter based on received light from the energized light emitter to configure multiple fiber optic communication channels between the light emitter and light detector arrays.

19. The method of claim 13 including the steps of: monitoring data communication over the at least one communication channel; and reconfiguring the mapping based on said monitored data communications thereof.

20. The method of claim 19 wherein the step of reconfiguring includes:
    measuring a data error rate of the at least one communication channel; and reconfiguring the mapping based on the measured data error rate thereof.

21. A method of configuring optical channels between a plurality of emitters and a plurality of detectors comprising:
    identifying an emitter to be mapped from the plurality of emitters;
    identifying a detector and a plurality of mapped and unmapped neighboring detectors for reading their light values;
    energizing the emitter to be mapped;
    reading the light values of the detector and its neighboring mapped and unmapped detectors;
    identifying which detector satisfies a light value criteria;
    determining if the detector satisfying the light value criteria has already been mapped to another emitter; and
    disabling the emitter to be mapped if the detector satisfying the light value criteria has already been mapped to another emitter.

* * * * *